US007289471B2

(12) United States Patent
Kawahara et al.

(10) Patent No.: US 7,289,471 B2
(45) Date of Patent: Oct. 30, 2007

(54) MOBILE ROUTER, POSITION MANAGEMENT SERVER, MOBILE NETWORK MANAGEMENT SYSTEM, AND MOBILE NETWORK MANAGEMENT METHOD

(75) Inventors: Toyoki Kawahara, Chofu (JP); Taisuke Matsumoto, Yokohama (JP); Shinkichi Ikeda, Yokohama (JP); Hirokazu Kobayashi, Inagi (JP); Masayuki Kumazawa, Yokohama (JP); Makoto Funabiki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 194 days.

(21) Appl. No.: 10/544,951

(22) PCT Filed: May 12, 2004

(86) PCT No.: PCT/JP2004/006672

§ 371 (c)(1),
(2), (4) Date: Aug. 8, 2005

(87) PCT Pub. No.: WO2004/102907

PCT Pub. Date: Nov. 25, 2004

(65) Prior Publication Data

US 2006/0146742 A1 Jul. 6, 2006

(30) Foreign Application Priority Data

May 13, 2003 (JP) ............................. 2003-134110
May 7, 2004 (JP) ............................. 2004-138221

(51) Int. Cl.
*H04Q 7/00* (2006.01)
*H04Q 7/24* (2006.01)

(52) U.S. Cl. ...................... 370/331; 370/338; 370/351
(58) Field of Classification Search ................ 370/331, 370/338, 328, 389, 351, 355, 386, 400, 401, 370/409, 395.31
See application file for complete search history.

(56) References Cited

U.S. PATENT DOCUMENTS 5,883,890 A * 3/1999 Okanoue et al. ............ 370/338
6,636,498 B1 * 10/2003 Leung ........................ 370/338

(Continued)

FOREIGN PATENT DOCUMENTS

JP 08-237717 9/1996

(Continued)

OTHER PUBLICATIONS

English translation of International Search Report for PCT/JP2004/006672, dated Jul. 27, 2004.

(Continued)

*Primary Examiner*—Sonny Trinh
(74) *Attorney, Agent, or Firm*—RatnerPrestia

(57) ABSTRACT

When connected to an external network, a mobile router checks an address 0table if a home address is allocated. If it is not allocated, the mobile router derives the address of a position management server from a position-management-server address table and sends an allocation request message to the position management server. The position management server receives an address management table listing addresses to be allocated to each mobile network and the allocation request message sent from the mobile router, searches the address management table for an unused address, and sends an allocation permission message to the mobile router to automatically allocate a home address to the mobile router.

12 Claims, 17 Drawing Sheets

U.S. PATENT DOCUMENTS

| | | | | |
|---|---|---|---|---|
| 6,647,264 | B1* | 11/2003 | Sasamoto | 455/445 |
| 6,771,623 | B2* | 8/2004 | Ton | 370/331 |
| 6,850,532 | B2* | 2/2005 | Thubert et al. | 370/401 |
| 6,865,184 | B2* | 3/2005 | Thubert et al. | 370/401 |
| 6,992,995 | B2* | 1/2006 | Agrawal et al. | 370/328 |
| 7,023,828 | B2* | 4/2006 | Korus et al. | 370/338 |
| 7,068,635 | B2* | 6/2006 | Dempo | 370/338 |
| 2003/0117965 | A1* | 6/2003 | Markki et al. | 370/254 |
| 2004/0202183 | A1* | 10/2004 | Thubert et al. | 370/395.31 |
| 2006/0080460 | A1* | 4/2006 | Kobayashi et al. | 709/238 |
| 2007/0053334 | A1* | 3/2007 | Sueyoshi et al. | 370/338 |

FOREIGN PATENT DOCUMENTS

| | | |
|---|---|---|
| JP | 2002-026954 A | 1/2002 |
| JP | 2003-069593 A | 3/2003 |
| JP | 2003-087299 A | 3/2003 |

OTHER PUBLICATIONS

Devarapalli, et al., "Network Mobility (NEMO) Basic Support Protocol" (IETF NEMO WG, draft-letf-nemo-basic-support-0.2.txt, Dec. 2003), pp. 1-37.

* cited by examiner

FIG.5A

| 501 | TENTATIVE ADDRESS | — | NONE |
|---|---|---|---|
| 502 | HOME ADDRESS | — | NONE |
| 503 | INTERNAL PREFIX | — | |

FIG.5B

| 501 | TENTATIVE ADDRESS | ForeignPrefix : : 10 | DONE |
|---|---|---|---|
| 502 | HOME ADDRESS | — | NONE |
| 503 | INTERNAL PREFIX | — | |

FIG.5C

| 501 | TENTATIVE ADDRESS | ForeignPrefix : : 10 | DONE |
|---|---|---|---|
| 502 | HOME ADDRESS | HomePrefix : : 10 | NONE |
| 503 | INTERNAL PREFIX | PrefixA | |

FIG.6

| HOME ADDRESS | PREFIX | TENTATIVE ADDRESS | AUTHENTICATION ID | FLAG |
|---|---|---|---|---|
| — | PrefixA | — | — | UNALLOCATED |
| HomePrefix::30 | PrefixB | ForeignPrefixB::30 | xxx2 | ALLOCATED |
| HomePrefix::40 | PrefixC | ForeignPrefixC::40 | xxx3 | NOW BEING ALLOCATED |
| — | PrefixD | — | — | UNALLOCATED |

| AUTHENTICATION ID | PREFIX | HOME ADDRESS | TENTATIVE ADDRESS | FLAG |
|---|---|---|---|---|
| — | PrefixA | — | — | UNALLOCATED |
| xxx2 | PrefixB | HomePrefix::30 | ForeignPrefixB::30 | ALLOCATED |
| | | — | — | UNALLOCATED |
| xxx3 | PrefixC | HomePrefix::40 | ForeignPrefixC::40 | NOW BEING ALLOCATED |
| | | — | — | UNALLOCATED |
| — | PrefixD | — | — | UNALLOCATED |

MOBILE ROUTER, POSITION MANAGEMENT SERVER, MOBILE NETWORK MANAGEMENT SYSTEM, AND MOBILE NETWORK MANAGEMENT METHOD

THIS APPLICATION IS A U.S. NATIONAL PHASE APPLICATION OF PCT INTERNATIONAL APPLICATION PCT/JP2004/006672.

TECHNICAL FIELD

The present invention relates to a mobile network arranged with a mobile router and a mobile terminal, and to a mobile network management method and mobile network management system for continuing communication even where the mobile network moves to an external network.

BACKGROUND ART

In the conventional mobile terminal management system, standardization is conducted by the IETF (Internet Engineering Task Force) Mobile-IP (Internet Protocol) working group, the standardizing organization for data sent over the Internet. Further, standardization of the mobile network management format where not only the terminal but rather the network in its entirety is to move is being planned by the IETF NEMO (Network Mobility) working group. JP-A-H8-237717 describes a conventional mobile network management technology.

Using figures, an explanation of this network management is made below.

FIG. 17 is a diagram showing an arrangement of a conventional mobile network management system. Home network 1001 is arranged with a home gateway 1003 connected to the Internet and a position management server 1002, wherein a mobile network 1004 is connected to the home network 1001 which is the home of the mobile network 1004. The mobile network 1004 is arranged with a mobile router 1005 holding an interface to an external network and an interface to an internal network, and a host node 1006. External network 1007 comprises an external access router 1008. Furthermore, there exists a communication node 1010 for communication with the mobile network 1004 by way of the Internet 1009.

In the document "Network Mobility (NEMO) Basic Support Protocol" (IETF NEMO WG, draft-ietf-nemo-basic-support-0.2.txt, December 2003), mobile router 1005 belongs to home network 1001 and has the home network prefix "Home Prefix" which is given to all the addresses of the home network 1001, and a network address "Home Prefix::10" generated from its own hardware address "10". This address is the sole address of mobile router 1005 over the Internet. Alternatively, if Prefix A is allocated as the network prefix within mobile network 1004, host node 1006 has a network address PrefixA::20, taken from its own hardware address "20".

In case the mobile router 1005 moves into a connection with a certain external network 1007, external access router 1008 of external network 1007 allocates an external network prefix "Foreign Prefix" to mobile router 1005. Mobile router 1005 establishes a tentative address for external network 1007, "Foreign Prefix::10", generated from the external network prefix "Foreign Prefix" and its own hardware address "10".

Mobile router 1005 gives its own tentative address "ForeignPrefix::10" to position management server 1002 of home network 1001, in order to transfer a packet. Position management server 1001 stores the received tentative address "ForeignPrefix::10" of mobile router 1004 and home address "HomePrefix::10" as a related pair.

Then, in the case where a data packet is to be sent from communication node 1010 existing on another network to the mobile router 1005 in question, communication node 1010 is not aware of a movement of the relevant router 1005, so the data packet is first sent to home network 1001 whether or not mobile router 1005 is connected to home network 1001.

In case the data packet destined for mobile router 1005 is sent from communication node 1010 to home network 1001, position management server 1002 in the relevant home network 1001 catches a packet having the mobile router 1005 home address "HomePrefix::10" which has been stored in the server memory, and transfers the data packet to the external network 1007 because the external address corresponding to the home address is "ForeignPrefix::10".

In the case of sending the data packet from communication node 1010 to host node 1006, transmission is made to the address "PrefixA::20" of host node 1006. The packet destined for that address is first sent to home network 1001 and then sent to mobile router 1005, which is the next hop router according to the routing table held by the home gateway. However, position management server 1002 catches the packet destined for the home address "HomePrefix::10" and sent by mobile router 1005, and transfers the data packet to the external network 1007 because the external address corresponding to the home address is "ForeignPrefix::10".

In this manner, in the conventional data communication, mobile router 1004 has two addresses, i.e. address in the home network 1000 and address in an external network 1007. Position management server 1001 in home network 1000 manages the positional information of the relevant mobile router 1004, and transfers a data packet. In this way, packet routing is realized which can adapt to the change in address identification due to movement of mobile router 1004.

Conventionally, in the case where a router is newly connected to the network, an IP address is automatically allocated from a DHCP (Dynamic Host Configuration Protocol) server. However, the address allocated by the DHCP server is recognized only within the sub-networks to which the DHCP belongs. It cannot be adapted to the case where the mobile router moves into a connection with another external network. For this reason, the "home address" of the mobile router must be set manually by the user, or else a connection must be made to the home network at the initial startup without exception, to be allocated an temporary address from the position management server.

However, where the mobile management server is set up by a ordinary service provider instead of a user having a mobile router, there is no way to establish a home address ahead of time because of the manufacturers of mobile routers and host nodes are different. Thus, there is a problem that the user must have a home address for mobile router and a network prefix for mobile network allocated from the contracted provider, and manually make settings.

DISCLOSURE OF THE INVENTION

It is an object of the present invention to provide a mobile network management system where a new mobile router automatically requests its own home address from a position management server, thereby effecting an allocation, and a mobile router, position management server and mobile network management method comprising this mobile network management system.

A mobile network management system according to the invention has an address table listing whether or not home and tentative addresses have been allocated to each mobile router, and an address allocation request section for checking from the address table whether or not there is an allocation of a home address by taking the opportunity presented by a connection to an external network to introduce a position management server address derived from a position management server address table holding position management server addresses and send an allocation request message to the position management server when no home address is allocated. The position management server has an address management table holding the addresses to be allocated to each mobile network, and an address allocating section for receiving an allocation request message from the mobile router and searching for an unused address out of the address management table, thereby sending an allocation permission message to the mobile router.

With this arrangement, the mobile router purchased by the user, even in the initial state, is allowed to automatically request a home address from the position management server, having this communication with no trouble to the user.

A mobile network managing method according to the invention comprises a mobile router which has an external interface for connection to an external network and an internal interface for connection to an internal network, a mobile network comprising one or plural terminals provided with which is provided with internal interfaces for connection to an internal network, and a position management server which manages allocation of addresses to that mobile network, and transfers a communication packet sent to a home address to an address of an external network. The mobile router checks an address table listing allocations of home address and tentative address to determine whether or not there is an allocation of a home address, and when there is no allocation of a home address the router requests a home address and a tentative address from the position management server.

This allows the mobile router to decide whether or not there is an allocation of a home address. In the case where a home address is not allocated, home and tentative addresses are requested from the position management server. Thus, even where the mobile network is not first positioned at the home network, the all the addresses of the mobile network can be allocated without causing trouble to the user.

Alternatively, a mobile network management method of the invention comprises: a step where a mobile router receives a tentative address from an external network; a step where, if the mobile router has not acquired a home address, the mobile router requests a home address allocation from a home-address-allocating position management server by sending a message to which the tentative address is attached; a step where the position management server allocates an unused address to the mobile router and sends the allocated home address to the mobile router; a step where the mobile router receives the home address and sends a response to the position management server when the mobile router registers the home address; and a step where the position management server registers the mobile router and the home address, making a connection between the two, when the response is received.

Due to this, the newest address allocation can be obtained by connecting to an external network and taking the opportunity to acquire a tentative address. Further, address allocation can be acquired by a simple procedure using a request message and the response message to that request.

Alternatively, in a mobile network management method according to the invention, the mobile router requests the allocation of home address from the position management server, adding to this request an authentication ID to allow allocation, the position management server checking whether or not the authentication ID is the authentication ID of one of the objects being managed, and allocating a home address to the mobile router if it is confirmed to be one of the objects being managed.

Due to this, because the position management server allocates a home address only to particular mobile routers, the mobile router under control can be restricted.

Alternatively, a mobile network management method according to the invention includes a step where a second mobile router requests acquisition by proxy of a home address from the first mobile router which has been allocated a home address by the position management server, a step where a first mobile router requests by proxy a home address for the second mobile router from the position management server, a step where the position management server allocates a home address to the second mobile router and sends it to the first mobile router, and a step where the first mobile router transfers the home address received to the second mobile router.

By these steps, a mobile router newly added to the mobile network can acquire its own home address before connected to an external network.

A mobile router according to the invention comprises: an address table listing allocations of home address and tentative address; an address allocation request section for checking the address table to determine whether or not a home address has been allocated; a position management server address table listing the addresses of position management servers for allocating a home address; and an address registering section for registering the received home address and tentative address in the address table; whereby when the address allocation request section decides there is no allocation of a home address in the address table, it sends a request for an allocation together with the tentative address to the position management server, and the address registering section updates the address table with the allocated home address received from the position management server.

Due to this, even where the mobile network is at first not positioned at the home network, addresses can be allocated to the entire mobile network without inflicting trouble on the user.

Alternatively, when a mobile router according to the invention acquires a tentative address from an external network, the address allocation request section requests an allocation from the position management server.

This makes it possible to acquire the newest address allocation.

Alternatively, the address allocation request section of the mobile router in the invention sends to the position management server a request for allocation together with an authentication ID for authorizing home address allocation.

After this, the mobile router is identified by its authentication ID and allocated with a home address.

Alternatively, a mobile router according to the invention further includes a proxy request section for requesting by proxy a home address from the position management server, and an address transfer section for transferring the home address acquired by proxy from the position management server; wherein the proxy request section, when receiving a request for acquisition by proxy from another mobile router in an internal network, sends the request for the allocation together with the ID identifying the other mobile router, the address transfer section transferring the home address received from the position management server to the other mobile router which requested acquisition by proxy.

This makes it possible to acquire by proxy a home address of a mobile router not yet connected to the external network and deliver this address to this router.

A position management server according to the invention comprises: an address management table listing home addresses to be allocated to mobile routers and an address allocating section which receives an allocation request from the mobile router, searches the address management table for an unused address, and sends the home address which has been allocated to the mobile router.

Due to this, by presenting the mobile router a home address in response to a request from the mobile router, even where the mobile network is not at first connected to the home network, addresses can be allocated to the entire mobile network without inflicting trouble on the user.

Alternatively, a position management server according to the invention further includes an authentication list recording authentication IDs permitting allocation of a home address to a mobile router, the address allocating section which checks whether or not the authentication ID of a first mobile router requesting a home address is the same as an authentication ID of the authentication list, and which, if it is the same, allocates and sends a home address to the first mobile router.

This makes it possible to identify a mobile router by its authentication ID and allocate a home address to it.

Alternatively, when the address allocating section of a position management server according to the invention receives a reception response from the first mobile router indicating that the home address has been received, the address allocating section records the authentication ID and the allocated home address of the mobile router associating these two in the address management table, so as to prevent a new home address allocation request from a mobile router having the same authentication ID.

This restricts the home address allocation requests from the same mobile network. Alternatively, when address allocation permission could not be received due to trouble in the mobile network, and allocation is to be attempted again, the position management server can detect the fact that an address has not been allocated, thus preventing incorrect address allocation.

Alternatively, when the address allocating section of a position management server according to the invention receives an allocation request of a home address for the second mobile router from the first mobile router which already has been allocated a home address, the address allocating section allocates a new home address to the second mobile router and sends it to the first mobile router.

Due to this, a home address is allocated only in response to a home-address request by proxy from a mobile router already authenticated, enabling allocation restriction.

Alternatively, a mobile network management system according to the invention comprises: a mobile router according to the invention and a position management server according to the invention.

Due to this, even where the mobile network is at first not connected to the home network, addresses for the mobile network can be allocated without requiring the labor and time of the user.

As described above, the invention can automatically allocate a home address to a mobile router and a terminal under control of the router without a troublesome setting operation by the user.

BRIEF DESCRIPTION OF THE DRAWINGS

FIGS. 5A to 5C are figures showing logical setting examples of mobile router address table in embodiment 1 of the invention.

FIG. 6 is a figure showing a logical setting example of position-management-server address management table in embodiment 1 of the invention.

FIG. 16 is a figure showing a logical setting example of an address management table in the position management server in embodiment 2 of the invention.

BEST MODE FOR CARRYING OUT THE INVENTION

Using the drawings, explanation will now be made of embodiments of the present invention.

Embodiment 1

Figure 1:
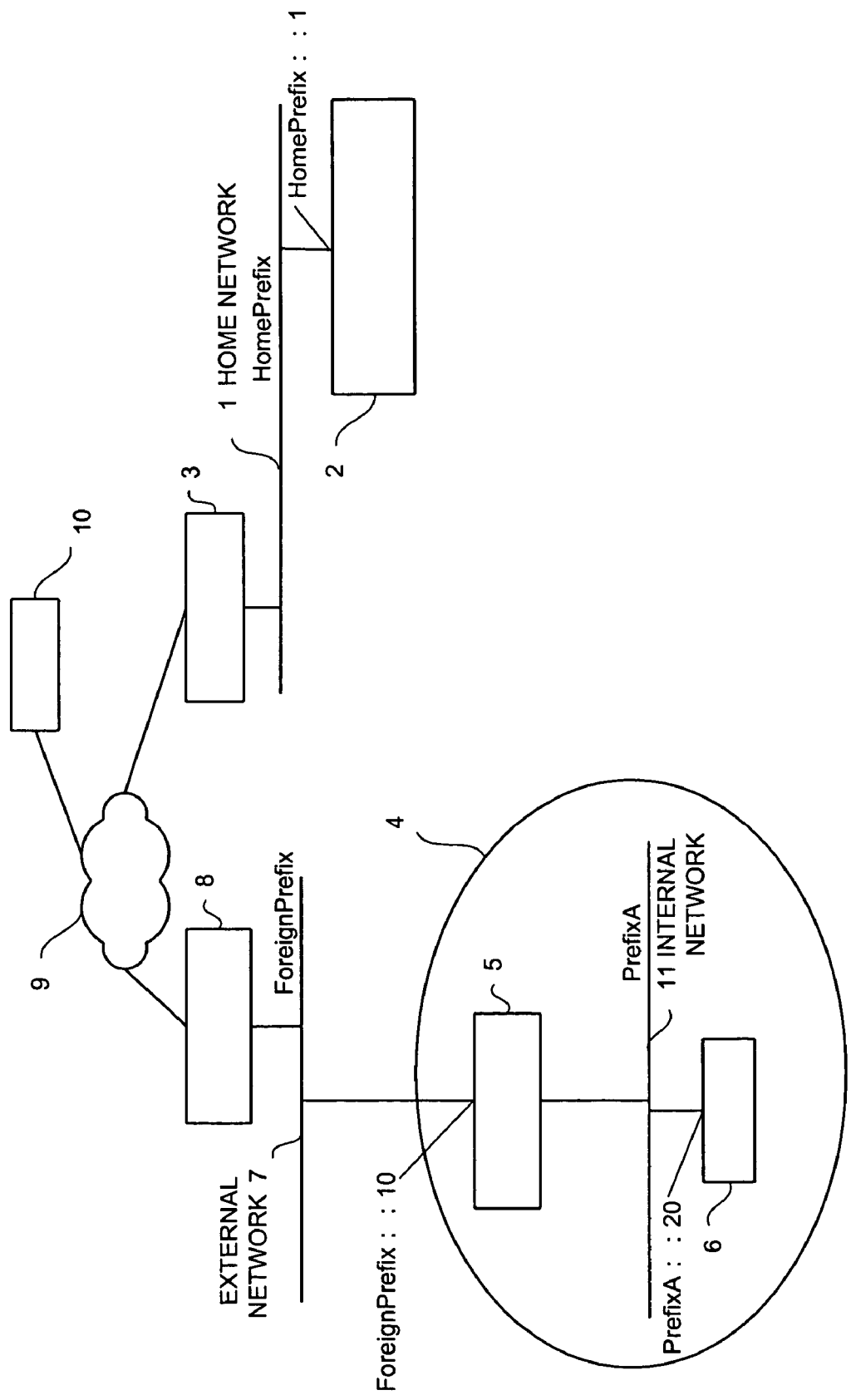
FIG. 1 is a block arrangement diagram of a mobile network management system in embodiment 1 of the present invention.

FIG. 1 is a block arrangement diagram of a network including a mobile network management system in embodiment 1 of the invention.

In FIG. 1, home network 1 comprises home gateway 3 connected to the Internet and position management server 2. Mobile network 4 is moved to external network 7 instead of home network 1 which has been made the home of mobile network 4.

Alternatively, mobile network 4 comprises mobile router 5 holding an interface to external network 7 and an interface to internal network 11, and host node 6.

Alternatively, external network 7 is configured by an external access router 8.

Furthermore, there exists communication node 10 for communication with mobile network 4 by way of the Internet 9. Incidentally, the mobile router communication mode may be wired or wireless.

Figure 17:
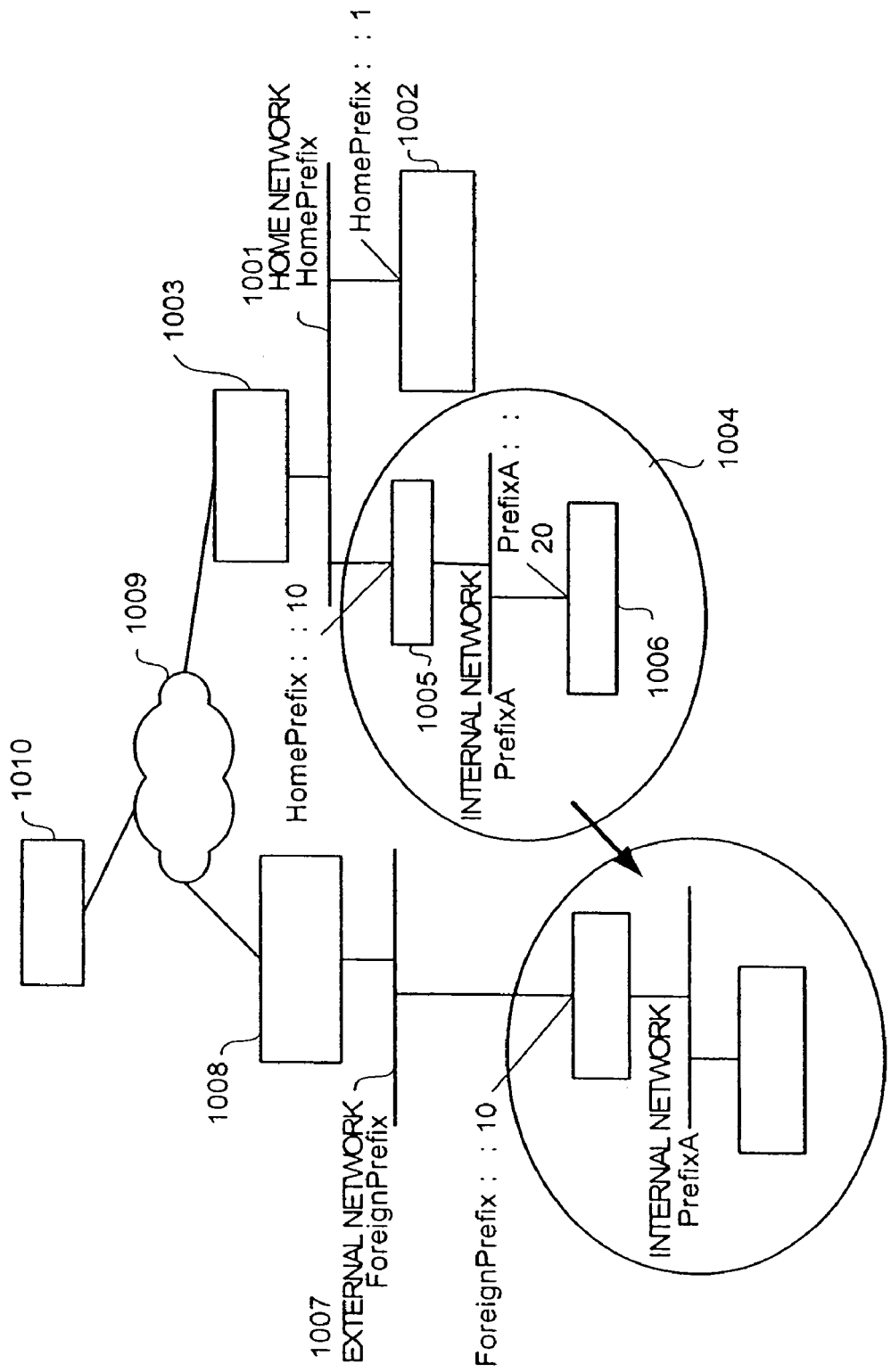
FIG. 17 is a block arrangement diagram of a mobile network management system in the prior art.

This embodiment explains mainly the differences from FIG. 17 explained in the prior art.

Figure 7:
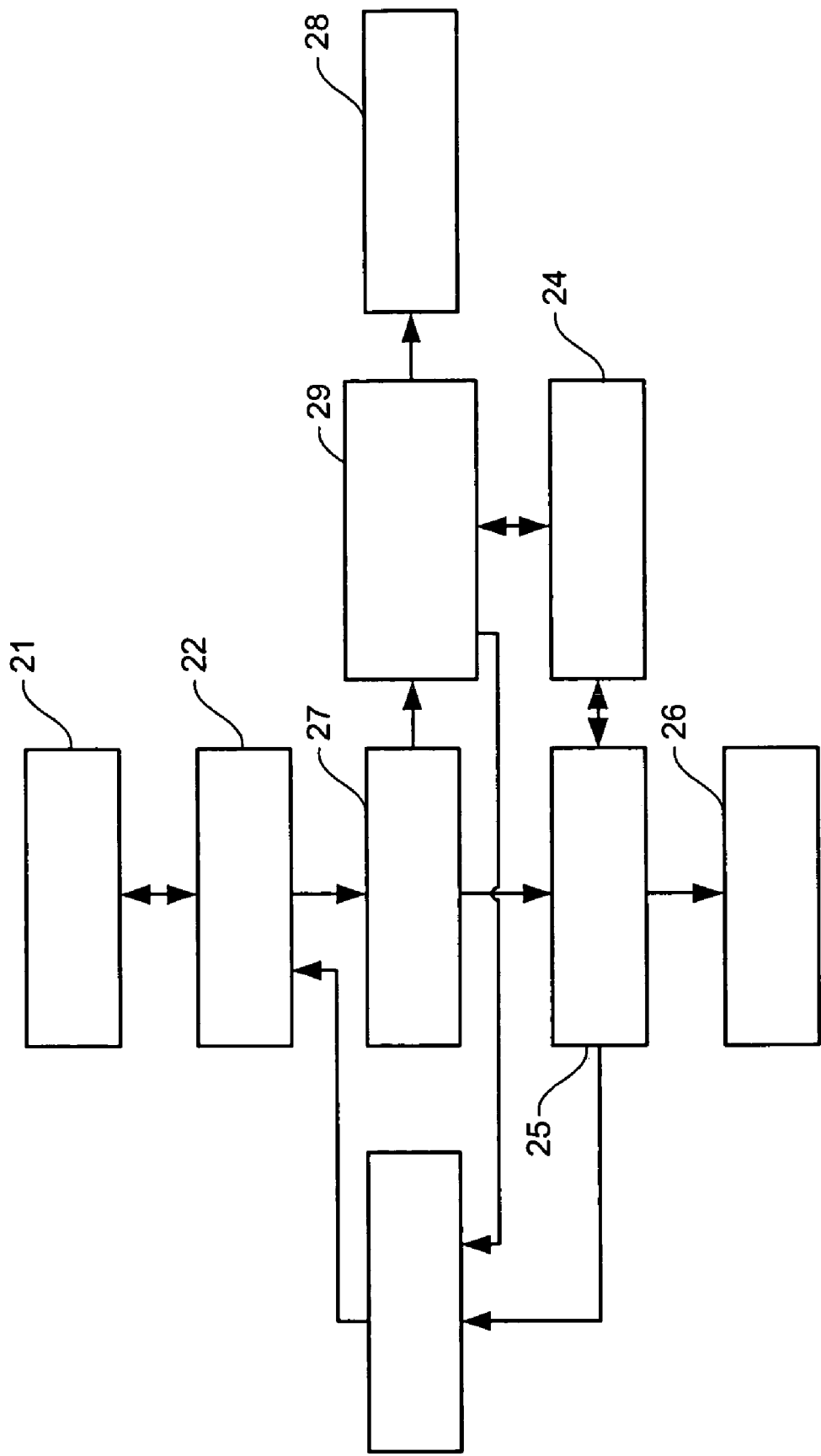
FIG. 7 is a block configuration diagram of the position management server in embodiment 1 of the invention.

In FIG. 7, position management server 2 comprises a network IF 21 which is a physical network interface for connection to home network 1, a packet transmitter/receiver section 22 for sending and receiving a packet, packet generating section 23 for generating a message, address management table 24 listing associations between home addresses and mobile routers, an address allocating section 25 for processing an address allocation message received from mobile router 5, an authentication ID list 26 listing authentication IDs authorizing address allocation, a server message analyzing section 27 for determining the type of message received, a position management table 28 recording the current position of mobile routers, and a position managing section 29 managing the current position of the mobile router.

Figure 8:
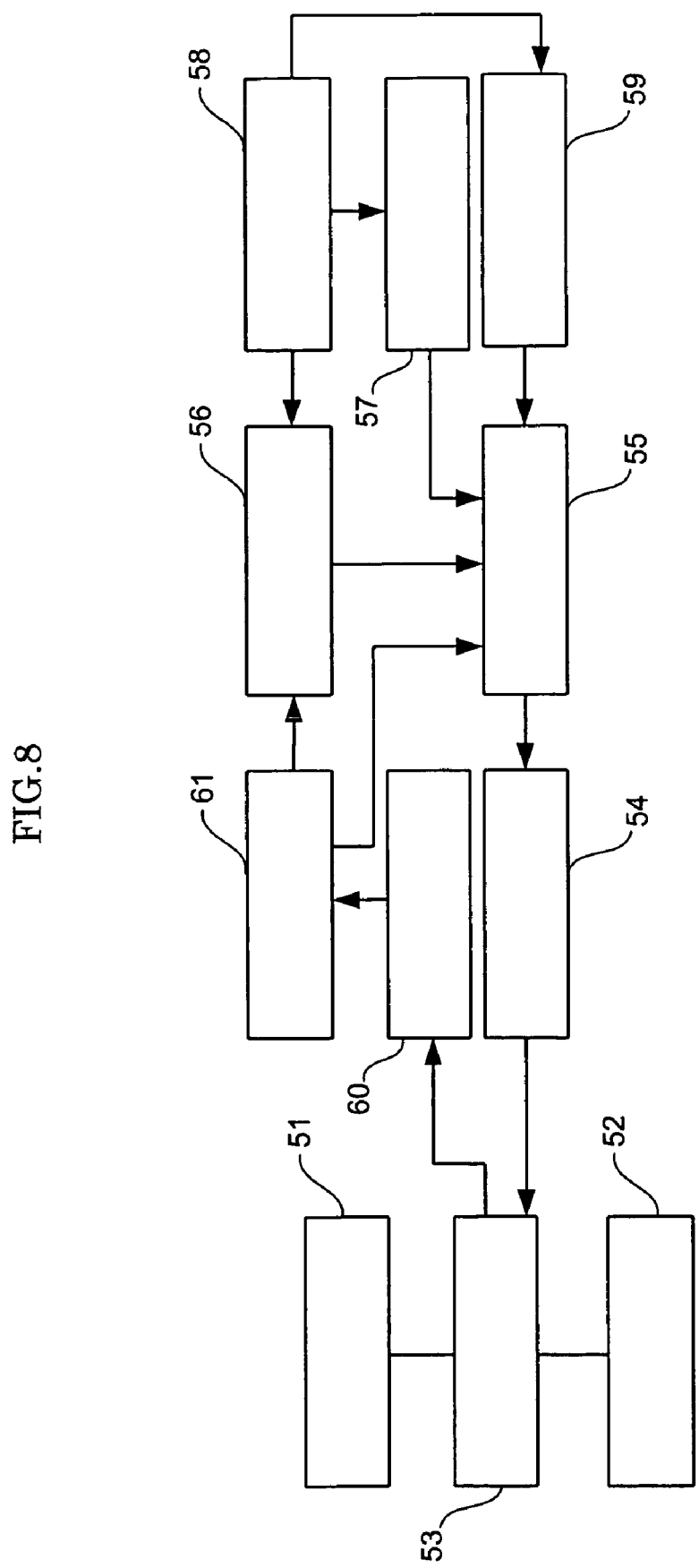
FIG. 8 is a block configuration diagram of the mobile router in embodiment 1 of the invention.

Alternatively, in FIG. 8; mobile router 5 comprises an external-network IF 51 which is a physical network interface for connection to the external network 7, an internal-network IF 52 which is a physical network interface for connection to the internal network 11, a packet transmitter/receiver section 53 for sending and receiving a packet, a packet generating section 54 for generating a message to gain address allocation, an address allocation request section 55 processing a message for transmission/reception to/from position management server 2 concerned with address allocation, an address table 56 listing home addresses and fixed addresses, a position-management-server-address table 57 listing the addresses of position management servers 2, user IF 58 for a user to add an address to position-management-server-address table 57 and address table 56, an authentication-ID recording section 59 recording authentication IDs which authorize address allocation, message analyzing section 60 for checking a received message, and address registering section 61 for registering tentative and home addresses to address table 56.

Position management server 2 and mobile router 5 comprise a mobile network management system.

Referring to the drawings, explanation will now be made of the operation of the mobile network management system configured as above.

Figure 2:
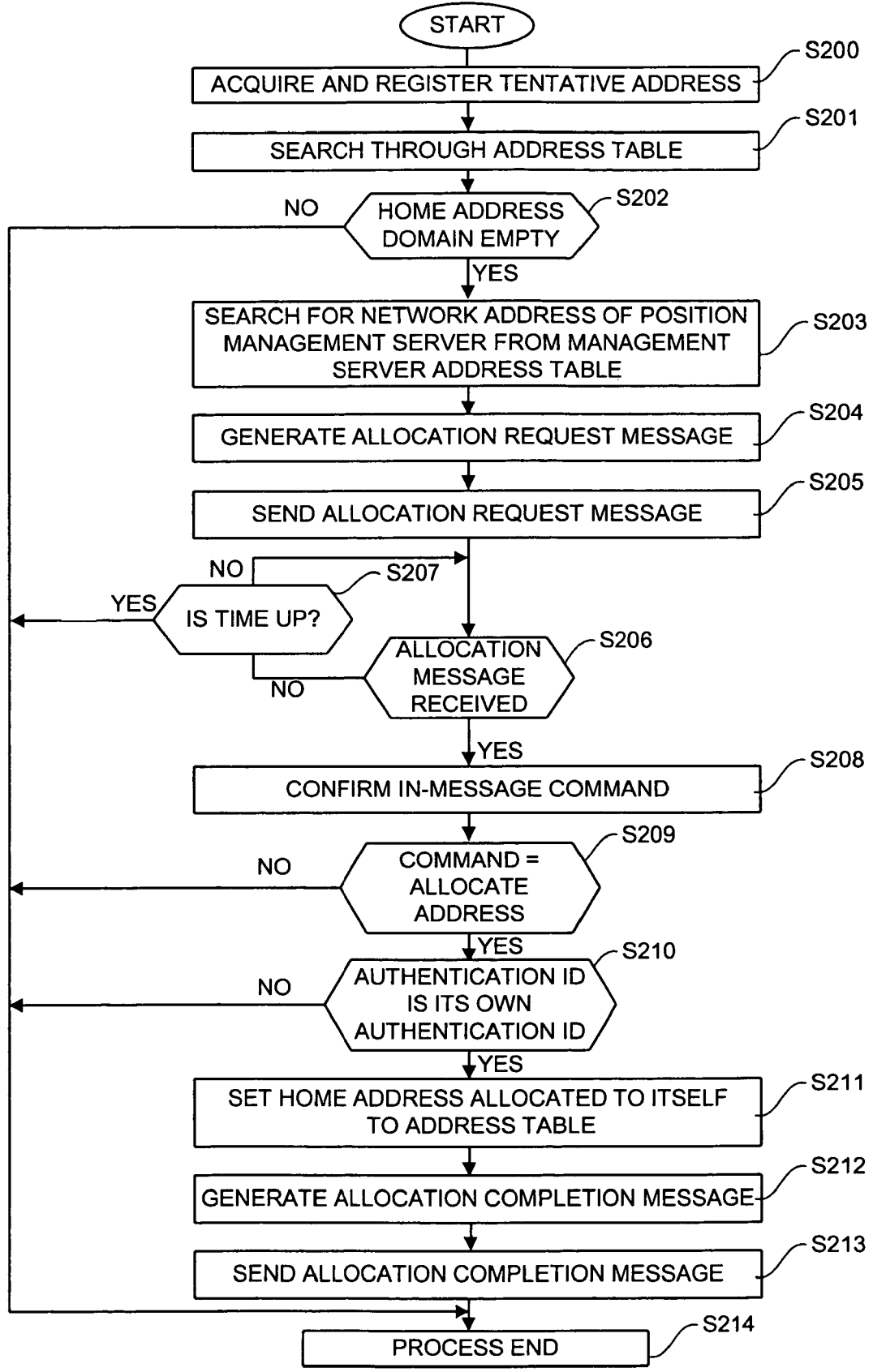
FIG. 2 is a flowchart of an address allocation process of a mobile router in embodiment 1 of the invention.
Figure 3:
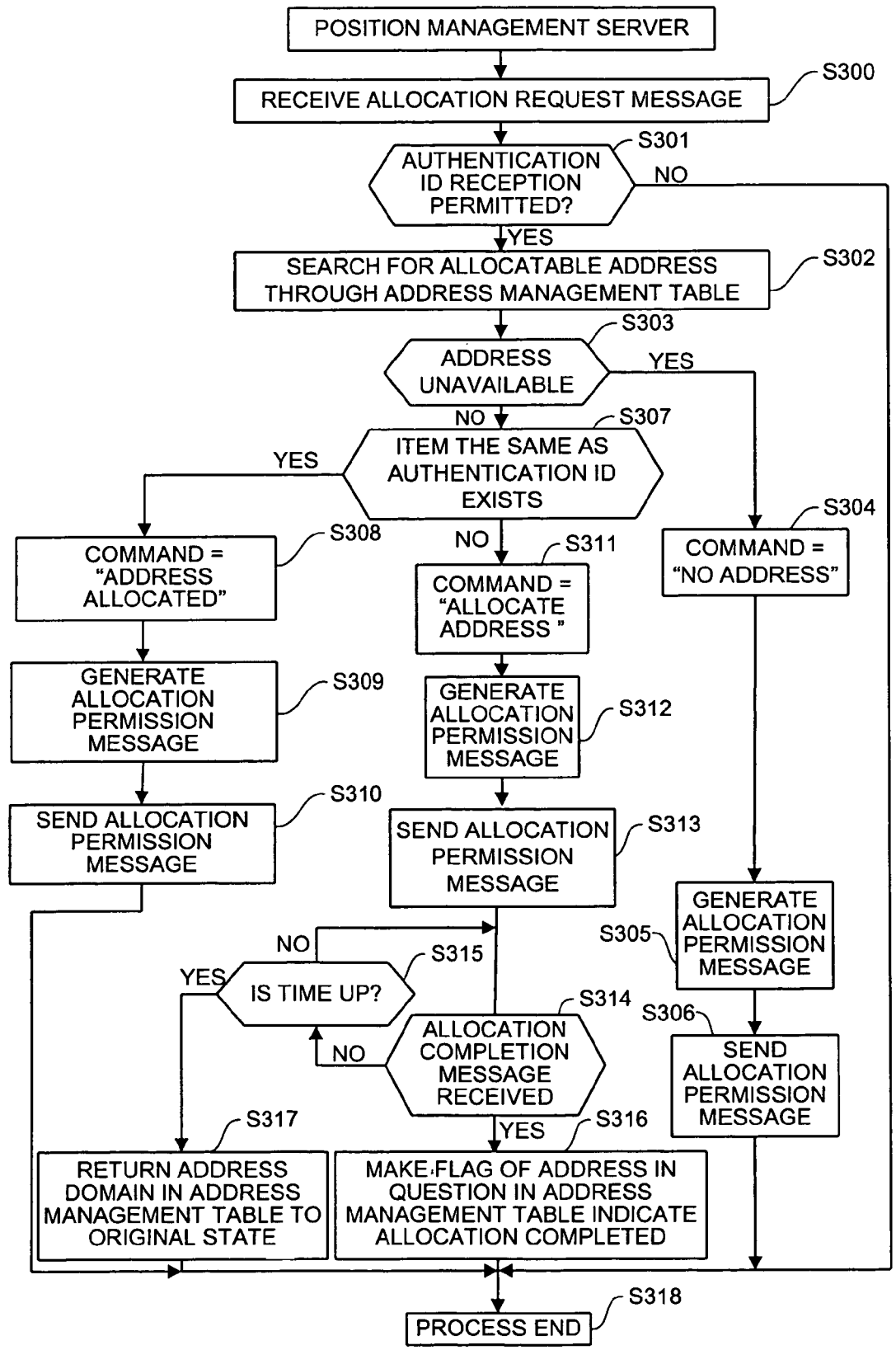
FIG. 3 is a flowchart of an address allocation process of a position management server in embodiment 1 of the invention.

FIG. 2 is a flowchart of an address allocation process on the mobile router 5 in embodiment 1 of the invention. FIG. 3 is a flowchart of an address allocation process on the position management server 2 in embodiment of the invention. FIGS. 4A to 4E are figures showing a structure of an address allocation request message while FIGS. 5A to 5C are figures showing a logical setting example of an address table 56 had by the mobile router 5. FIG. 6 is a figure showing a logical setting example of an address management table 24 in the position management server 2.

First of all, mobile router 5 is explained.

At first, when mobile router 5 is connected to the external network 7, its external network IF 51 receives a temporary, tentative address "ForeignPrefix::10" from external access router 8 of external network 7 and delivers it to message analyzing section 60 through packet transmitter/receiver section 53. Message analyzing section 60 identifies this as a message for address registration and sends it to address registering section 61. Address registering section 61 registers the received tentative address in address table 56 (step S200). Note here that mobile router 5 is given a hardware address "10". Address table 56, in the initial state, is empty of tentative addresses 501, home addresses 502, and internal prefixes 503, as shown in FIG. 5A. It is turned into a FIG. 5B state by an acquisition of tentative address 501.

Then, when address registering section 61 acquires a tentative address 501, it searches through address table 56 to determine whether or not there is a home address of the device concerned (step S201). In address table 56, in case home address allocation is completed in home address domain 502, the process is ended (step S202).

In the case where home address allocation is not ended, address registering section 61 requests address-allocation request section 55 to acquire a home address. Address-allocation request section 55 searches position-management-server-address table 57 in the position management server 2 for a network address of position management server 2 (step S203). Here, when position management server 2 is not found, a message may be outputted to the user IF section 58, to prompt the user to input an address.

Figure 4A:
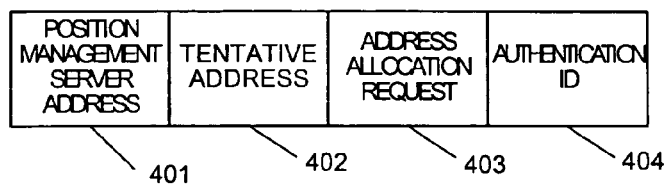
FIG. 4A is a figure showing a format of address allocation request message in embodiment 1 of the invention.

Then, in the case where a network address is checked for position management server 2, address-request allocating section 55 issues an instruction to packet generating section 54, to generate an address-allocation request message 400 shown in FIG. 4A (step S204). Here, "destination address" 401 is set to be the network address of position management server 2, source address 402 is set to be the "tentative address", and command 403 is set to the value representing "address allocation request". Further, "authentication ID" 404 is set to be one of the unique IDs provided for each mobile network upon contract with a provider, the mobile network user having been previously notified of this ID through some means, and the user subsequently having recorded this ID in authentication ID recording section 59 through user IF section 58, etc. Through the "authentication ID", position management server 2 can identify a packet from any of the mobile networks.

Then, packet generating section 54 forwards message 400 to packet transmitter/receiver section 53. Packet transmitter/receiver section 53 transfers a packet from external network IF 51 according to the packet's destination address (step S205).

Figure 4B:
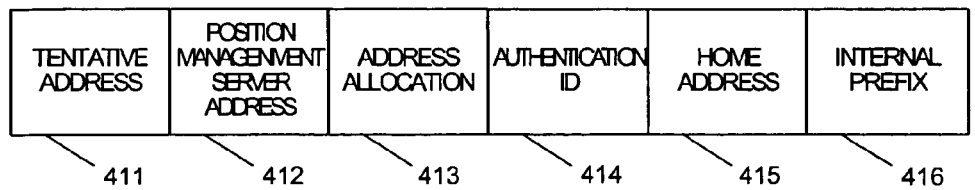
FIGS. 4B to 4D are figures showing formats of address allocation permission message in embodiment 1 of the invention.
Figure 4C:
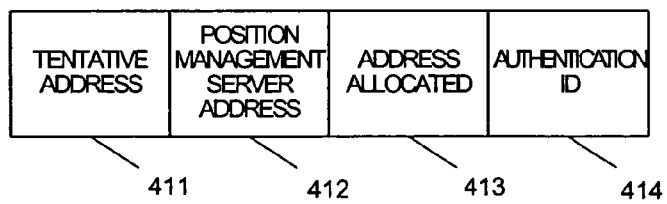
Figure 4D:
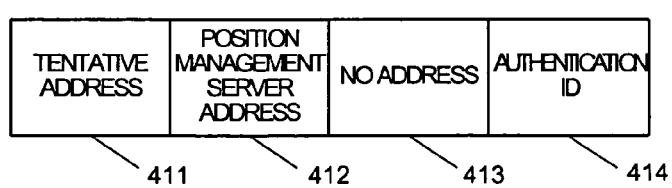

Then, address-allocation request section 55, after sending address-allocation request message 400, starts a constant time timer and waits for reception of an address-allocation permission message 410 as shown in FIG. 4B from position management server 2 (step S206). It is monitored whether or not time has run out (step S207). If time has run out, the process is ended (step S214). Here, the address-allocation permission message 410 shown in FIG. 4B has a tentative address entered in "destination address" 411 and the network address of position management server 2 entered in "source address" 412. Alternatively, in the case position management server 2 has an address to be allocated, the value representing "address allocation" is set in command 413, the home address of mobile router 5 is set in home address 415, and the mobile-network internal prefix is set in prefix 416. Alternatively, where the corresponding address has already been allocated, the value representing "allocated" is set in command 413 as shown in FIG. 4C. Where there is no available address to be allocated by the position management server 2, the value representing "no address" is set in command 413 as shown in FIG. 4D.

Then, when mobile router 5 receives an address-allocation permission message 410 from position management server 2, address registering section 61 confirms the command within the address-allocation permission message 410 (step S208). In case the command 413 within address-allocation permission message 410 is "allocate address", authentication ID 414 is checked (step S209). In case the command 413 is not "allocate address", the process is ended (step S214).

Then, address registering section 61 checks whether or not authentication ID 414 is the authentication ID of the device concerned (step S210). In the case where it is not the authentication ID of the device concerned, the process is ended (step S214). In the case where it is the authentication ID of the device concerned, address registering section 61 stores the home address 415 and the internal prefix 416 allocated to the device concerned in address table 56, as shown in FIG. 5C.

Figure 4E:
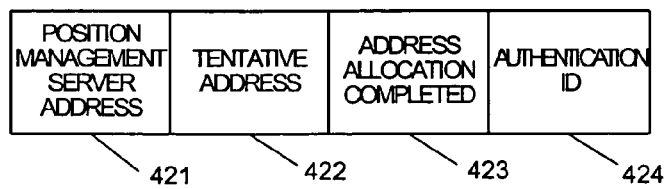
FIG. 4E is a figure showing a format of address allocation completion message in embodiment 1 of the invention.

Address registering section 61 notifies the address-allocation request section 55 of setting completion. Address-allocation request section 55 instructs the packet generating section 54 to generate address allocation completion message 420 as shown in FIG. 4E (step S212). Here, "destination address" 421 is set to be the network address of position management server, "source address" 422 is the tentative address, and command 423 is the value representing "address allocation completion".

Then, packet transmitter/receiver section 53 sends address-allocation completion message 420 to position management server 2 (step S213). After sending the message, the process is ended (step S214).

Thereafter, by executing neighbor discovery, a general prefix solution process defined under IPv6 (Internet Protocol Version 6), the host node 6 requests a network prefix for mobile router 5 and can decide its own address. This allows communication with the entire mobile network.

Using the operation flowchart of FIG. 3, explanation will now be made of the process in the case where the position management server 2 receives an address-allocation request message 400.

First, packet transmitter/receiver section 22 of position management server 2 receives a message through network IF 21, and server message analyzing section 27 checks the type thereof. In the case where the received message is a address-allocation request 400, server message analyzing section 27 relays it to address allocating section 25 (step S300).

Then, address allocating section 25 checks whether or not the received authentication ID is present in authentication ID list 26. When not present, the ID is determined to require registration, and the process is ended (step S318).

Alternatively, in the case where the authentication ID is present in authentication ID list 26, search is made through address management table 24 using the authentication ID 404 as a key (step S302). FIG. 6 shows a logical item example of address management table 24. Here, "home address" 601 is the address of the terminal at which position management is being effected, "prefix" 602 is the network prefix of the internal network 11 contacted by the terminal, and "tentative address" 603 is the temporary address of the terminal allotted by the external network to which the mobile network will be connected. "Authentication ID" 604 is set to be the authentication ID of the network which has been allocated an address, and "flag" 605 indicates the state where home address is allocated.

Then, address allocating section 25 checks whether or not there is a home address available to be allocated (step S303). In the case where there is no available address, the address-allocation permission message 410 command value 413 is set to indicate "no address", as shown in FIG. 4D (step S304).

Then, address allocating section 25 issues an instruction to packet generating section 23, to thereby generate an address-allocation permission message 410 as shown in FIG. 4D (step S305).

Then, packet generating section 23 forwards address-allocation permission message 410 to packet transmitter/receiver section 22. Packet transmitter/receiver section 22 transfers a packet from network IF 21 appropriately according to the destination address (step S306), thus ending the process (step S318).

Alternatively, in the case where there is no available address at step S303, address allocating section 25 checks whether or not there exists the same authentication ID as authentication ID 604 in question (step S307). When flag 605 in address management table 24 shows "allocated", it is concluded that a home address is already allocated to the network having this authentication ID. Alternatively, in case flag 605 shows "now being allocated", it is concluded that an address is now being allocated. If flag 605 shows "allocated" or "now being allocated", command value 413 in address allocation permission message 410 as shown in FIG. 4C is set as "address allocated" (step S308).

Then, address allocating section 25 issues an instruction to packet generating section 23 to generate address-allocation permission message 410 shown in FIG. 4C (step S309). Packet transmitter/receiver section 22 sends the message through network IF 21 (step S310) thus ending the process (step S318).

Alternatively, at step S307, in the case where no item of authentication ID exists yet but there is an available address in address management table 24, address allocating section 25 makes command value 413 indicate "allocate address" and sets that home address 415 and internal prefix 416 in the address-allocation permission message 410 (step S311).

FIG. 4B shows the address-allocation permission message 410. Here, "home address" 415 is the home address to be given to mobile router 5 while "internal prefix" 416 is the network prefix to be used for the internal network 11 of the mobile network 4.

Thereafter, address allocating section 25 issues an instruction to packet generating section 23 to generate address-allocation permission message 410 shown in FIG. 4B (step S312).

Then, packet generating section 23 forwards address-allocation permission message 410 to packet transmitter/receiver section 22. Packet transmitter/receiver section 22 transfers a packet from network IF 21 appropriately based on the destination address (step S313).

Then, address allocating section 25, after sending address-allocation permission message 410, starts a constant time timer and waits to receive address-allocation completion message 420 of FIG. 4C from mobile router 5 (step S314). It is monitored whether or not time has run out (step S315). In the case where time has run out, address allocating section 25 judges that the destination mobile router could not receive address-allocation permission message 410 and returns the home address from address management table 24 which had been allocated to its former state (step S317). Then, the process is ended (step S318).

Alternatively, when address allocating section 25 receives address-allocation completion message 420 (step S314), it confirms whether there is agreement between "home address" 601 searched from address management table 24 using an "authentication ID" as the key and the destination address. In case those are in agreement, flag 605 in address management table 24 is changed to "done" (step S316), to end the process (step S318).

By performing the address allocation process as above, host node 6 is allocated with PrefixA::20, home address is allocated with HomePrefix::1 and mobile router 5 tentative address is allocated with ForeignPrefix::10, as shown in FIG. 6.

By performing an address allocating process as explained above, a network address can be automatically given to the mobile router and the host node under control of the mobile router, eliminating need for the user to make a troublesome setting operation.

Embodiment 2

Figure 10:
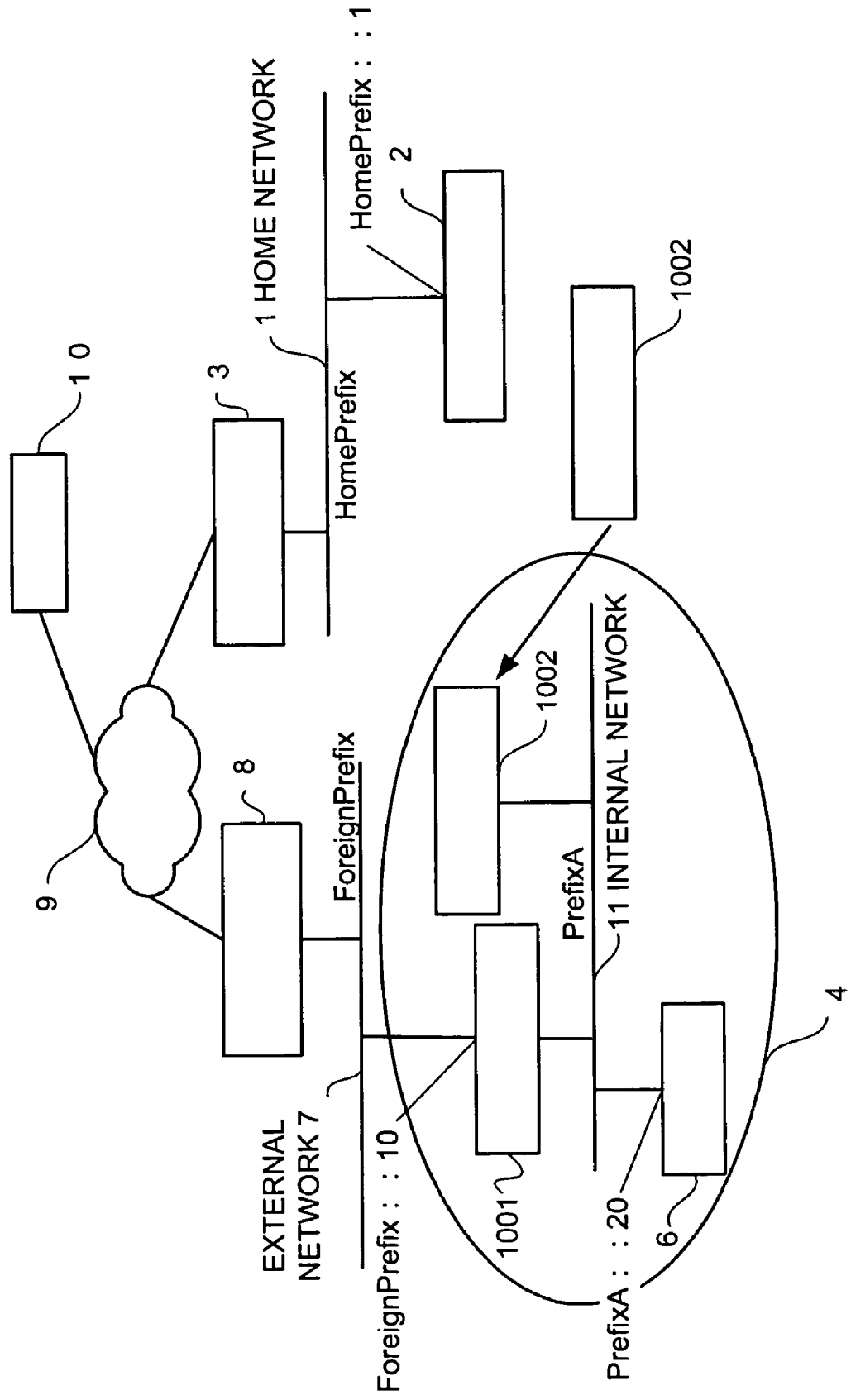
FIG. 10 is a block arrangement diagram of a mobile network management system in embodiment 2 of the invention.

FIG. 10 is a block diagram showing the network configuration in the present embodiment.

The difference between the network in FIG. 10 and the mobile network in embodiment 1 is that the mobile network is connected with first mobile router 1001 and second mobile router 1002. The first mobile router 1001 and the second mobile router 1002 have their configurations shown in the block diagram in FIG. 9.

Figure 9:
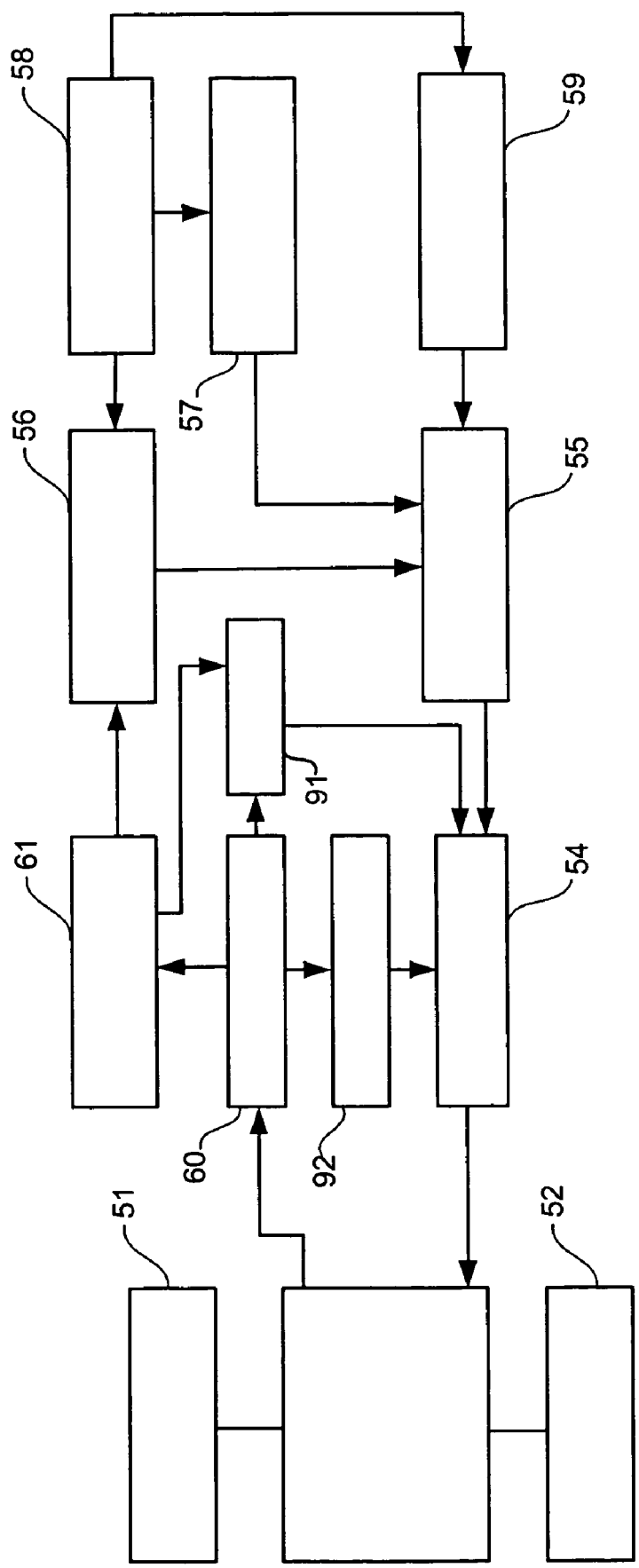
FIG. 9 is a block configuration diagram of the mobile router in embodiment 2 of the invention.

In FIG. 9, the mobile router in embodiment 2 of the invention is also different from the mobile router in embodiment 1 in that the mobile router in embodiment 2 has a proxy request section 91 for requesting another mobile router to acquire by proxy a home address or requesting by proxy a home address for another router from a position management server, and address transfer section 92 for transferring a home address received by one mobile router to the mobile router that made the request and is the destination of the home address.

Explanation will now be made of the operation and function of the mobile router configured as above.

First, the first mobile router acquires its own home address when connected to an external network for the first time, an operation which is the same as that of embodiment 1.

Then, the second mobile router is connected to internal network 11 under control of the first mobile router 1001 instead of being connected to an external network 7, an operation which is explained below referring to the drawings.

Figure 11:
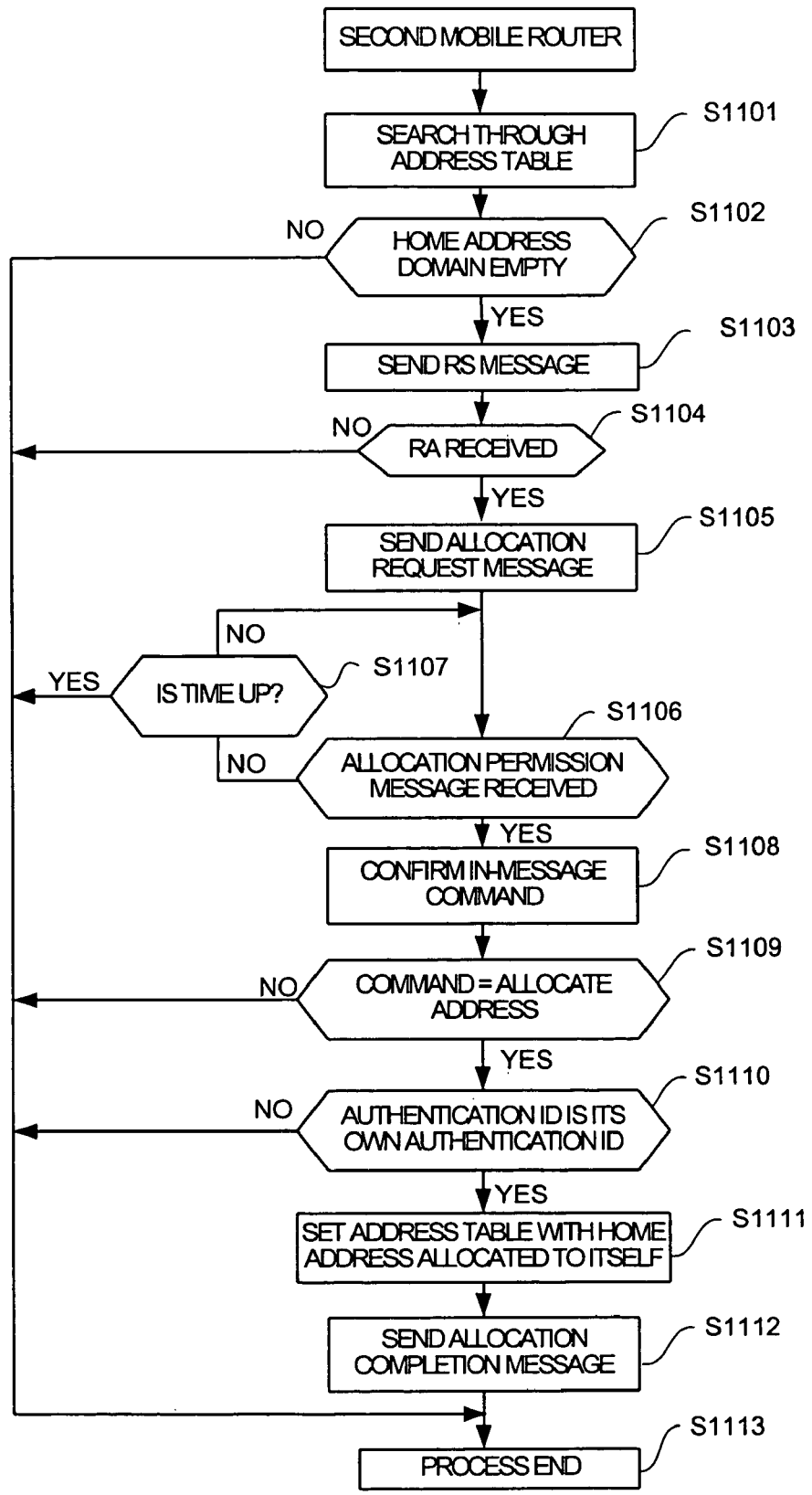
FIG. 11 is a flowchart of an address allocation process of a second mobile router in embodiment 2 of the invention.

FIG. 11 is a flowchart showing the home address allocating operation of the second mobile router.

First, in the initialization process, the second mobile router checks whether or not a home address is registered in address table 56 (step S1101).

In the case where the home address domain is empty as in address table 56 shown in FIG. 5A, an initialization processing section, not shown, instructs the packet generating section 54 to send an RS (router selection) message to the internal network through the internal network IF 52 (step S1103). In the case where the domain is not empty, a home address is considered already acquired and the process is ended (step S1113). The RS message is a message that is to inquire about a router connected to the internal network. The router, received it, responds an RA (router advertisement) message thereby notifying its own existence.

Then, the initialization processing section waits to receive an RA message from another router connected to the internal network (step S1104). When an RA message is not received in a predetermined time, judgment is made that another router is not connected thus ending the process (step S1113).

Figure 14A:
FIGS. 14A and 14B are figures showing formats of address allocation request message in embodiment 2 of the invention.

Then, when packet transmitter/receiver section 53 receives an RA message through the internal network IF 52, message analyzing section 60 relays it to the proxy request section 91. Proxy request section 91 instructs the packet generating section 54 to send an address allocation message requesting by proxy a home address for the mobile router that sent the RA message. Receiving this instruction, packet generating section 54 generates the address-allocation request message shown in FIG. 14A. This address-allocation request message is different from that of embodiment 1 in that it contains the address of the router in question 1401. The address of the router in question 1401 represents the mobile router requesting home address allocation. In this case, an address is set which is to be determined from a prefix of the internal network of the second mobile router. Alternatively, destination address 401 is set to be that of the first mobile router, source address 402 is set to be its own address (address of the second mobile router), command 403 is made the code indicating that this is a home-address-allocation request message, and authentication ID 404 is set to be its own authentication ID. This authentication ID is usually set to be the same ID as that of the first mobile router because one authentication ID is usually used on a sub-network. Alternatively, where the second mobile router does not have an authentication ID, setting is not made at all.

Packet generating section 54 generates an address-allocation request message having these settings and delivers it to packet transmitter/receiver section 53. Packet transmitter/receiver section 53 sends it to the first mobile router 1001 through internal network IF 52 (step S1105).

Using FIG. 12, explanation will now be made here on the operation of the first mobile router that receives the address-allocation request message and requests by proxy a home address.

Figure 12:
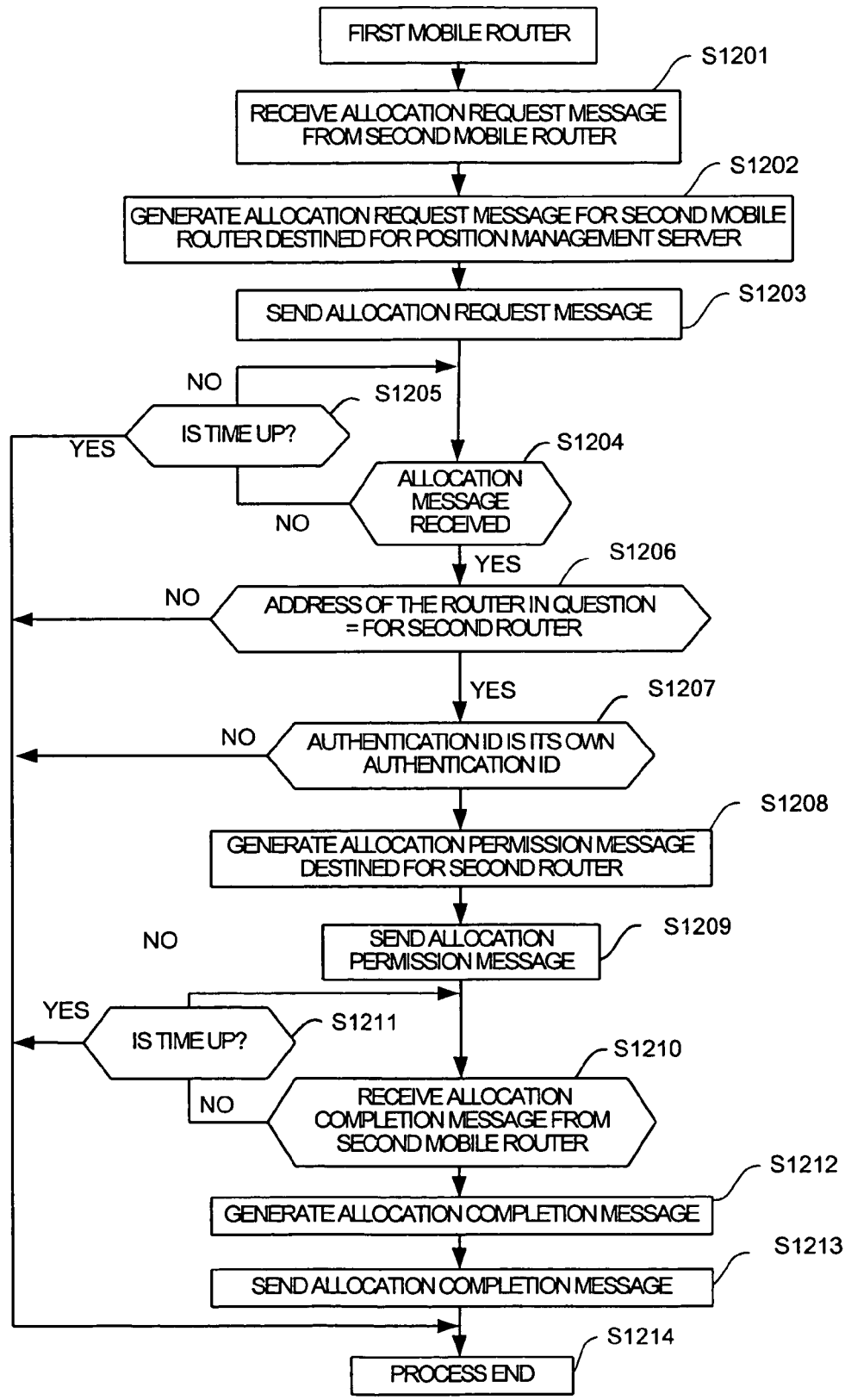
FIG. 12 is a flowchart of an address allocation process of a first mobile router in embodiment 2 of the invention.

In FIG. 12, when packet transmitter/receiver section 53 of the first mobile router receives an address-allocation request message from the second mobile router through internal network IF 52, the message analyzing section 60 notifies the proxy-request section 91 (step S1201).

Figure 14B:
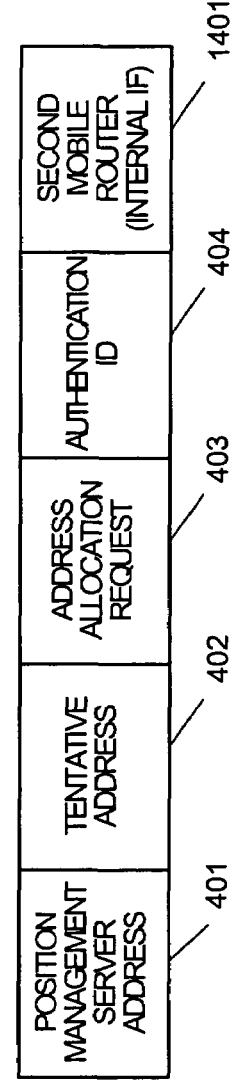

Receiving this notification, proxy-request section 91 instructs the packet generating section 54 to send an address-allocation request message requesting home address allocation for second router 1002 to the position management server 2. Packet generating section 54 generates the address-allocation request message shown in FIG. 14B. In the address-allocation request message, the address of the router in question 1401 is set to be the address of the second mobile router which made the request for home address allocation.

Destination address 401 is set to be the address of position management server 2. Source address 402 is set to be this router's own address (address of the first mobile router). Command 403 is set to be the code indicating that this is a home-address-allocation request by proxy message. If an authentication ID is set in the address-allocation request message from the second mobile router, that authentication ID is set to be authentication ID 404. In case an authentication ID is not set in the address-allocation request message from the second mobile router, the router's own authentication ID is set.

Packet generating section 54 generates an address-allocation request message having such a setting (step S1202) and delivers it to packet transmitter/receiver section 53. Packet transmitter/receiver section 53 sends it to position management server 2 through the external network 51 (step S1203). Then, the router waits for confirmation of reception of the address-allocation permission message in a response to the address-allocation request message (step S1204).

Using FIG. 13, explanation will now be made of the process executed by position management server 2 upon receiving the address-allocation request message from first mobile router 1001.

Figure 13:
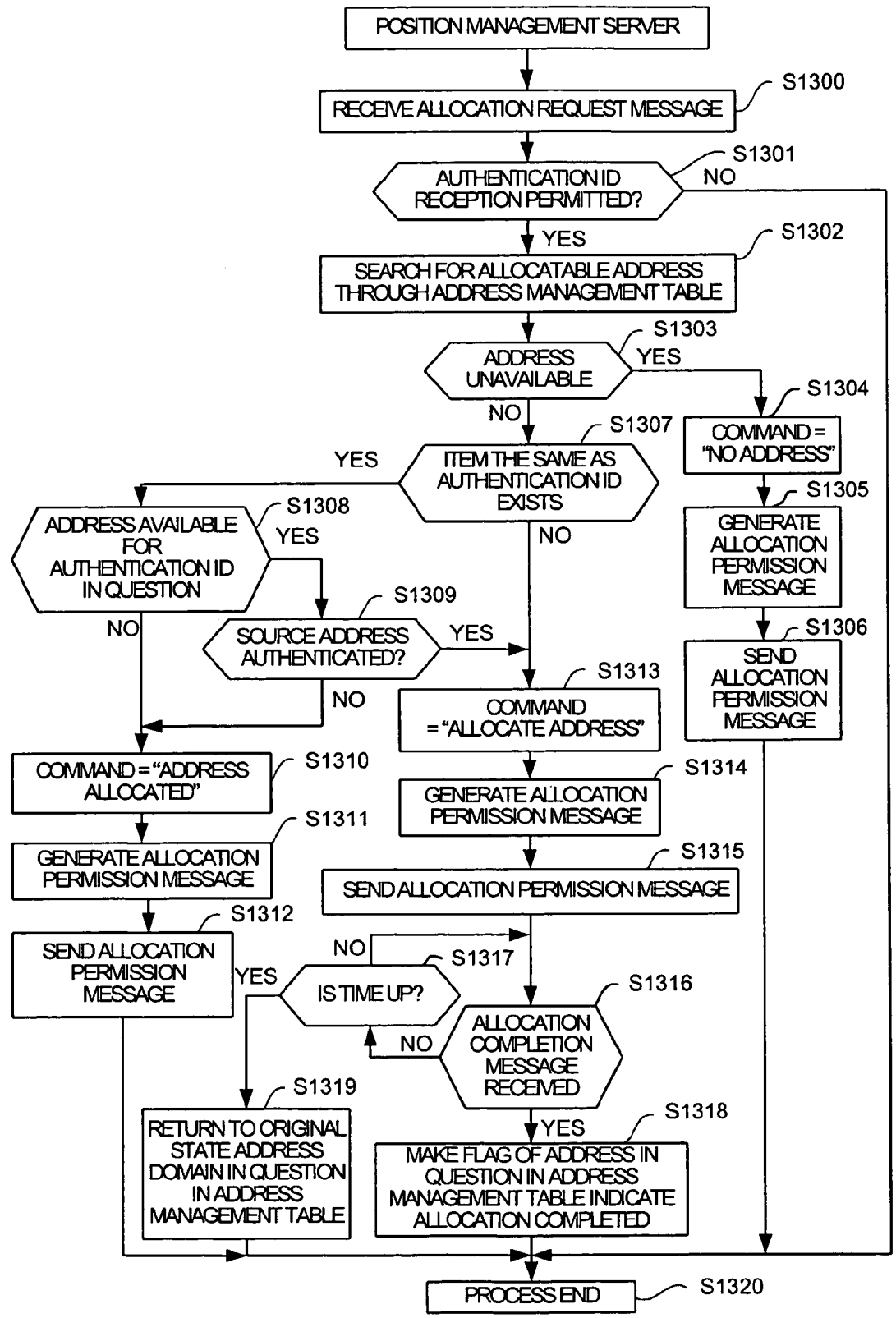
FIG. 13 is a flowchart of an address allocation process of a position management server in embodiment 2 of the invention.

In FIG. 13, the process of from step S1300 to step S1307 is the same as the process of from step S300 to step S307 in embodiment 1.

At step S1307, when there is already an item which is the same as the authentication ID, embodiment 1 carried out a transmission with "address allocated" set in command 413 of the address-allocation permission message, judging that a home address has already been allocated (steps S308, S309, S310). However, in embodiment 2, address allocating section 25 checks whether or not the number of home addresses allocated to the authentication IDs in question is less than the total number of home addresses (step S1308). In the case where there is still an available one, the address of the mobile router requesting the allocation is checked by looking up the address management table 24, to decide whether or not it has already been authenticated (step S1309). When it is confirmed that this is a request from an authenticated mobile router, address allocating section 25 allocates a new home address to the second mobile router specified by the address of the router in question contained in the address-allocation request message received. That is, address allocating section 25 additionally registers home address 601, tentative address 603 and flag 605 in the position having the same authentication ID as that of the first mobile router 1001, in the address management table shown in FIG. 16. The flag, in this case, made to indicate "now being allocated". Then, address allocating section 25 instructs packet generating section 23 to generate an address-allocation permission message whose command 403 is "allocate address" (step S1313).

Figure 14C:
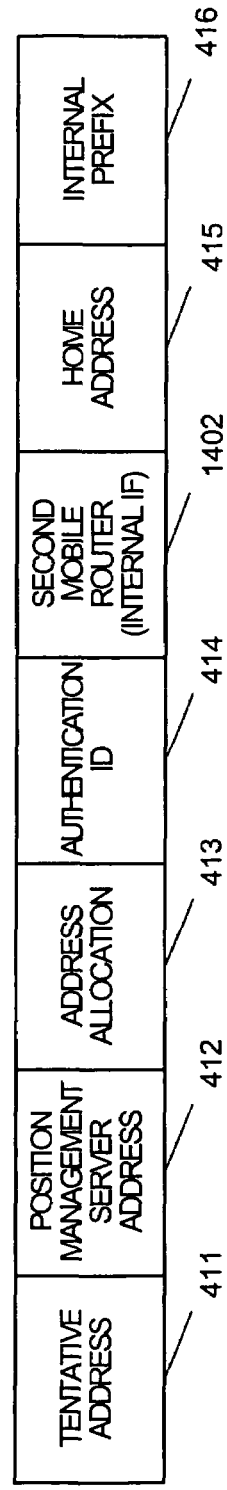
FIGS. 14C and 14D are figures showing formats of address allocation permission message in embodiment 2 of the invention.

Then, packet generating section 23 generates an address-allocation permission message in the format shown in FIG. 14C. This message is different from that shown in FIG. 4B in that it includes the address of the router in question 1402.

Packet generating section 23 sets command 413 to be "allocate address", and enters the allocated home address 415 and internal prefix 416 in the address-allocation permission message 410. Further, in the place for the address of the router in question 1401 is set the address of the internal network of the second mobile router, from which a message has been received (step S1314). The subsequent operations (step S1315 to step S1320) are similar to the process (step S313 to step S318) in embodiment 1.

Using FIG. 12, explanation will now be made of the operation executed by first mobile router 1001 upon receiving an address-allocation permission message from position management server 2. Incidentally, when there is no reception of a response message after waiting for a predetermined time, the process is ended (step S1205).

When the packet transmitter/receiver section 53 of first mobile router 1001 receives the message (step S1204), message analyzing section 60 notifies proxy request section 91. Proxy request section 91 checks whether or not the address of the router in question 1401 is that of the second mobile router (step S1206). In the case where it is not the second mobile router, the process is ended (step S1204).

However, in the case where it is the second mobile router, the first router checks whether the authentication ID 1404 is the authentication ID of the mobile network to which the first router belongs is to use commonly (step S1207). If the authentication ID is that of its own network, proxy request section 91 instructs packet generating section 54 to send an address-allocation permission message to the second mobile router.

Figure 14D:
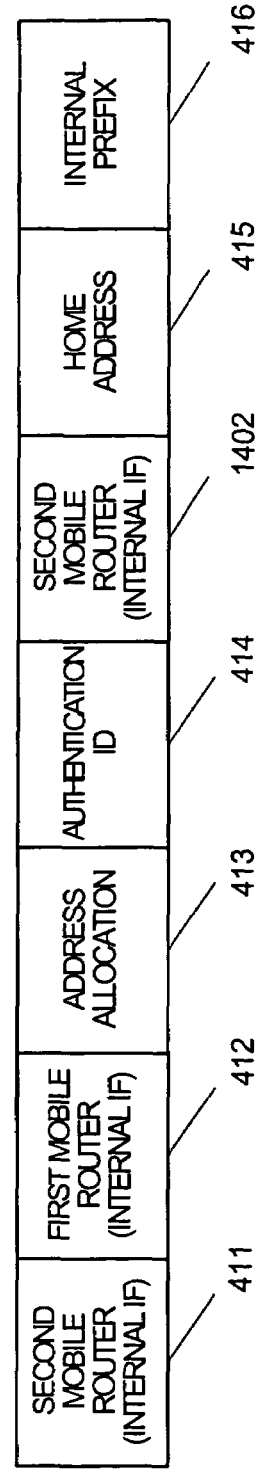

Receiving it, packet generating section 54 generates the address-allocation permission message shown in FIG. 14D (step S1208). At this time, packet generating section 54 is caused to transfer the address-allocation permission message received from position management server 2 after having replaced destination address 411 with the address of the internal network of the second mobile router, and having replaced source address 412 with the address of the internal network of the first mobile router.

Then, packet transmitter/receiver section 53 sends the address-allocation permission message to the second router 1002 through internal network 52 (step S1209). Then, the router waits for reception of a response message from the second mobile router 1002 (step S1210).

Using FIG. 11, explanation will now be made of the operation executed by second mobile router 1002 upon receiving the address-allocation permission message from first mobile router 1001.

When packet transmitter/receiver section 53 of second mobile router 1002 receives a message through internal network 52 (step S1106), message analyzing section 60 judges the message to be an address-allocation permission message and notifies the address registering section 61. Address registering section 61 finds command 403 (step S1108) and checks whether or not the command is "allocate address" (step S1109). If the command is not "allocate address", the process is ended (step S1113). When it is "allocate address", the second router checks whether authentication ID 404 is of the mobile network to which it belongs (step S1110). In the case where it is different, the process is ended (step S1113). When the identification IDs agree, address registering section 61 records home address 415 and internal prefix 416 in the same address table, as in embodiment 1 (step S1111).

Figure 15A:
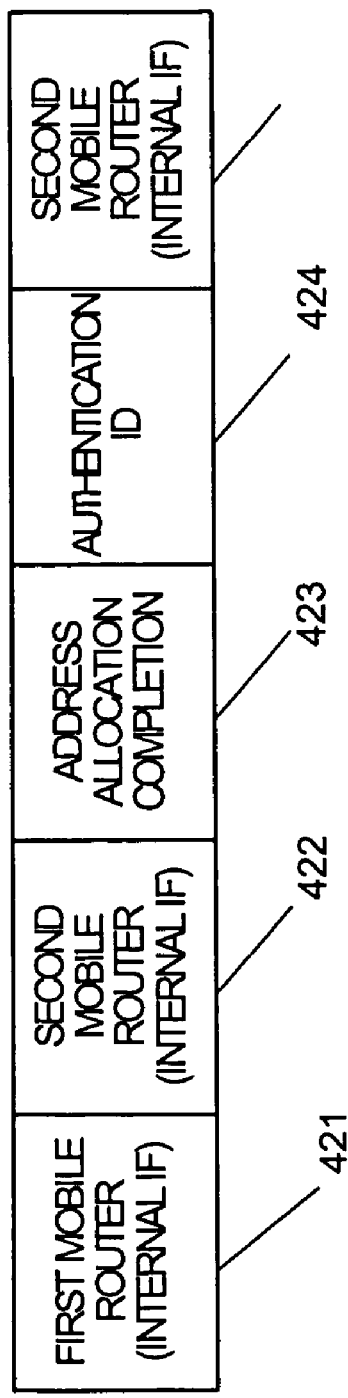
FIGS. 15A and 15B are figures showing formats of address allocation completion message in embodiment 2 of the invention.

Then, address registering section 61 notifies proxy request section 91 of completion of setting. Proxy request section 91 instructs packet generating section 54 to generate the address-allocation completion message shown in FIG. 15A. This address-allocation completion message is different from that of embodiment 1 in that it contains the address of the router in question 1501. Here, "destination address" 421 is set to be the internal network address of the first mobile router, "source address" 422 is set to be the internal network address of the second mobile router, command 423 is the value indicating "address allocation completed", authentication ID 424 is the identification ID of the second mobile router's mobile network, and the address of the router in question 1501 is with an internal network address of the device concerned (second router). Packet transmitter/receiver section 53 sends the address-allocation completion message to the first mobile router (step S1112). Thereafter, the process is ended (step S1113).

Using FIG. 12, explanation will now be made of the operation executed by first mobile router 1001 upon receiving the address-allocation completion message from second mobile router 1002.

Figure 15B:
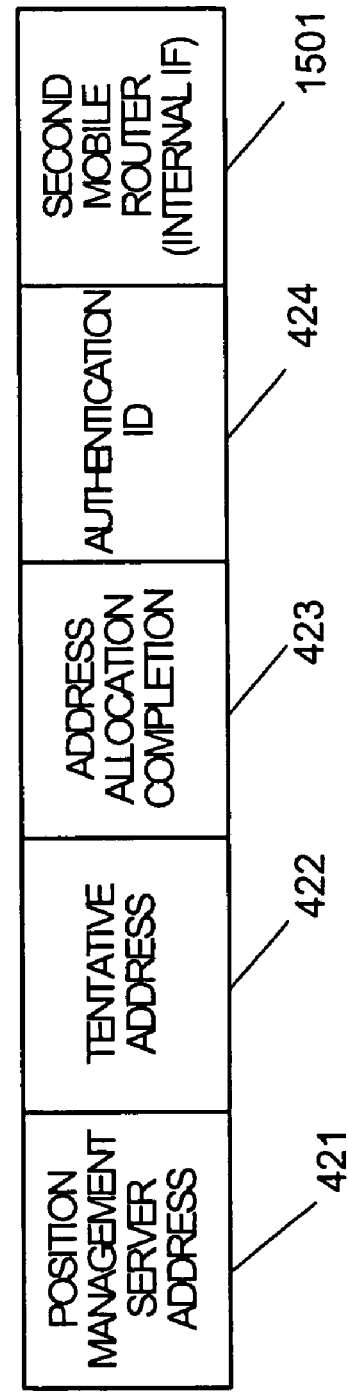

In case the packet transmitter/receiver section 53 of first mobile router receives a message, message analyzing section 60 analyzes the type of the message. In the case where it is an address-allocation completion message (step S1210), notification is made to proxy request section 91. Proxy request section 91 generates the address-allocation completion message shown in FIG. 15B (step S1212) in order to send by proxy the response comprising the received address-allocation completion message to position management server 2. Here, proxy request section 91 sets the position management server address in "destination address" 422, the external network address of first mobile router in "source address" 422, the value indicating "address allocation completion" in command 423, the identification ID of the second router's mobile network in authentication ID 424, and the internal network address of second mobile router in the address of the router in question 1501.

Then, packet transmitter/receiver section 53 sends the address-allocation completion message to the position management server (step S1213). Thereafter, the process is ended (step S1214).

As described above, according to the present embodiment, when a new mobile router is to be added to the mobile network, another mobile router already having a home address can, by proxy, automatically carry out the home-address allocation process before connection to an external network. Furthermore, due to this, the newly added mobile router can provide routing services immediately upon connection to the external network.

INDUSTRIAL APPLICABILITY

As described above, the present invention is a useful mobile network management system for a mobile network comprising mobile routers and a position management server for managing them, and suited for acquiring a home address when a new mobile router is connected to an external network.

The invention claimed is:

1. A mobile network managing method in which, when a mobile network including a mobile router having an external interface for connecting to an external network and an internal interface for connecting to an internal network and one or a plurality of terminals having an internal interface connecting to the internal network has moved away from a home network, a position management server for managing an address to be allocated to the mobile network transfers a communication packet directed to a home address of the mobile network to an external network address where the mobile network has moved to, wherein the mobile router checks an address table which holds allocations of a home address and a tentative address to determine whether the home address has been allotted or not and requests a home address and a tentative address from the position management server when the home address has not been allocated.

2. A mobile network management method comprising:

a step where a mobile router receives a tentative address from an external network;

a step where, if the mobile router has not acquired a home address, the mobile router requests a home address allocation from a home-address-allocating position management server by a message containing the tentative address;

a step where the position management server allocates an unused address to the mobile router and sends the home address thus allocated to the mobile router;

a step where the mobile router receives the home address, and sends a response to the position management server when the mobile router registers the home address; and a step where the position management server registers the mobile router and the home address with an association made between the two when the position management server receives the response.

3. A mobile network management method according to claim 2, wherein the mobile router sends a request for the allocation from the position management server together with an authentication ID for home address allocation, the position management server checking whether or not the authentication ID sent is the authentication ID of one of the items it manages, and allocating a home address to the mobile router if that router is confirmed to be one of the items the position management server manages.

4. A mobile network management method according to claim 2, including a step where a second mobile router requests a first mobile router to acquire by proxy a home address, the first mobile router having been allocated a home address by the position management server;

a step where the first mobile router requests by proxy a home address for the second mobile router from the position management server;

a step where the position management server allocates a home address to the second mobile router and sends it to the first mobile router; and a step where the first mobile router transfers the home address which is received to the second mobile router.

5. A mobile router comprising:

an address table listing allocations of home address and tentative address;

an address allocation request section which checks the address table to determine whether a home address has been allocated;

a position management server address table listing the address of a position management server for allocating a home address; and an address registering section for registering the received home address and tentative addresses in the address table;

whereby when the address allocation request section judges that there a home address that has not been allocated in the address table, it sends a request for allocation together with the tentative address to the position management server, and the address registering section updates the address table to include the allocated home address received from the position management server.

6. A mobile router according to claim 5, wherein the address allocation request section requests an allocation from the position management server when the mobile router acquires a tentative address from an external network.

7. A mobile router according to claim 5, wherein the address allocation request section attaches to the request for allocation from the position management server an authentication ID which authorizes home address allocation.

8. A mobile router according to claim 5, further including a proxy request section for requesting by proxy a home address from the position management server, and an address transfer section for transferring a home address acquired by proxy from the position management server;
   wherein when the proxy request section receives a request for an acquisition by proxy from another mobile router in an internal network, requests the allocation with an identifier identifying the other mobile router, and the address transfer section transfers the home address received from the position management server to the other mobile router that requested acquisition by proxy.

9. A position management server comprising:
   an address management table listing home addresses to be allocated to mobile routers;
   an address allocating section for receiving an allocation request from a mobile router, searching the address management table for an unused address, and sending the home address allocated to the mobile router; and
   an authentication list listing authentication IDs authorizing allocation of a home address to the mobile router,
   the address allocating section checking whether or not the authentication ID of a first mobile router requesting a home address is the same as an authentication ID of the authentication list, and if so, allocating and sending a home address to the first mobile router.

10. A position management server according to claim 9, wherein when the address allocating section receives a response confirming reception of a home address from the first mobile router, records the authentication ID and the allocated home address with association made between the two in the address management table, and does not allow a new home address allocation request from a mobile router having the same authentication ID.

11. A position management server according to claim 9, wherein when the address allocating section receives an allocation request of a home address for the second mobile router from the first mobile router which already has been allocated a home address, allocates a new home address to the second mobile router and sends it to the first mobile router.

12. A mobile network management system comprising:
   a mobile router having
   an address table listing allocations of home addresses and tentative addresses;
   an address allocation request section for checking the address table to determine whether a home address has been allocated;
   a position management server address table holding the address of a position management server for allocating a home address; and
   an address registering section for registering a received home address or tentative address in the address table;
   wherein, if the address allocation request section judges that a home address is not allocated in the address table, the address allocation request section sends a request for an allocation from the position management server attached with the tentative address, and the address registering section updates the address table with at the allocated home address received from the position management server; and
   a position management server having
   an address management table listing home addresses to be allocated to the mobile router; and
   an address allocating section for receiving an allocation request from the mobile router, searching the address management table for an unused address, and sending the home address allocated to the mobile router.

* * * * *

UNITED STATES PATENT AND TRADEMARK OFFICE
CERTIFICATE OF CORRECTION

| | | |
|---|---|---|
| PATENT NO. | : 7,289,471 B2 | Page 1 of 1 |
| APPLICATION NO. | : 10/544951 | |
| DATED | : October 30, 2007 | |
| INVENTOR(S) | : Kawahara et al. | |

It is certified that error appears in the above-identified patent and that said Letters Patent is hereby corrected as shown below:

On the Title Page, FIELD [57], ABSTRACT, line 2;
"address 0table" should read --address table--

Title Page;
On Page, 2, FIELD [56], References Cited, OTHER PUBLICATIONS:
Devarapalli, et al., Network Mobility (NEMO) Basic Support Protocol (IETF NEMO WG, "draft-letf-nemo-basic-support-0.2txt", … should read
--draft-ietf-nemo-basic-support-0.2txt--

Signed and Sealed this

Twentieth Day of May, 2008

JON W. DUDAS
*Director of the United States Patent and Trademark Office*